R. E. McINTIRE.
MOWING MACHINE.
APPLICATION FILED FEB. 4, 1916.
1,278,182.
Patented Sept. 10, 1918.
2 SHEETS—SHEET 2.
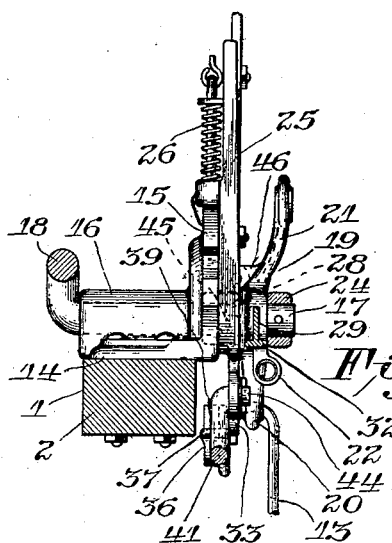
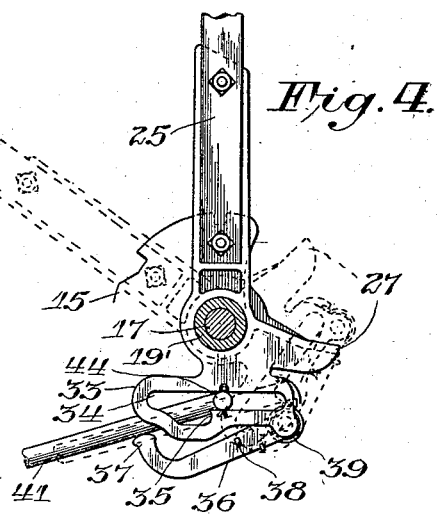
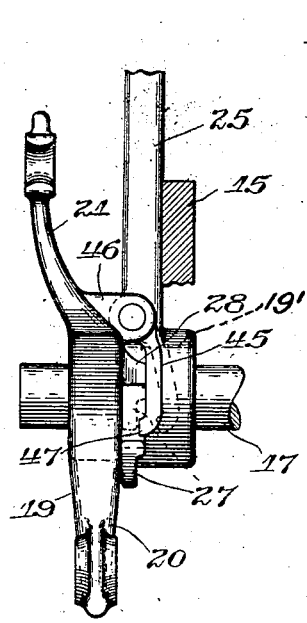
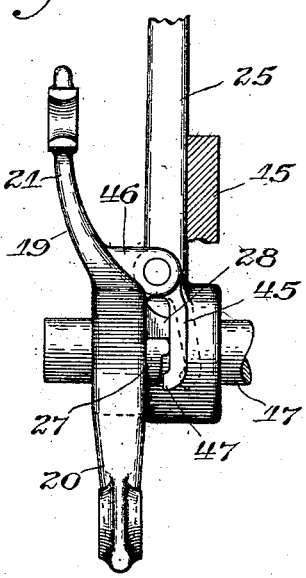
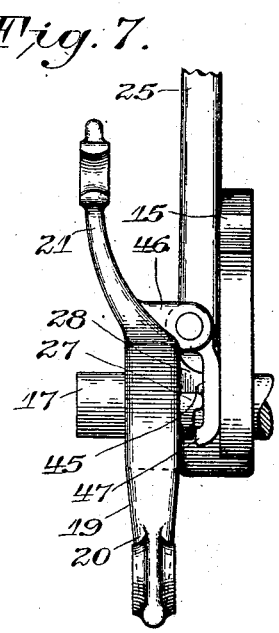
Inventor:
Richard E. McIntire,
By
Atty.

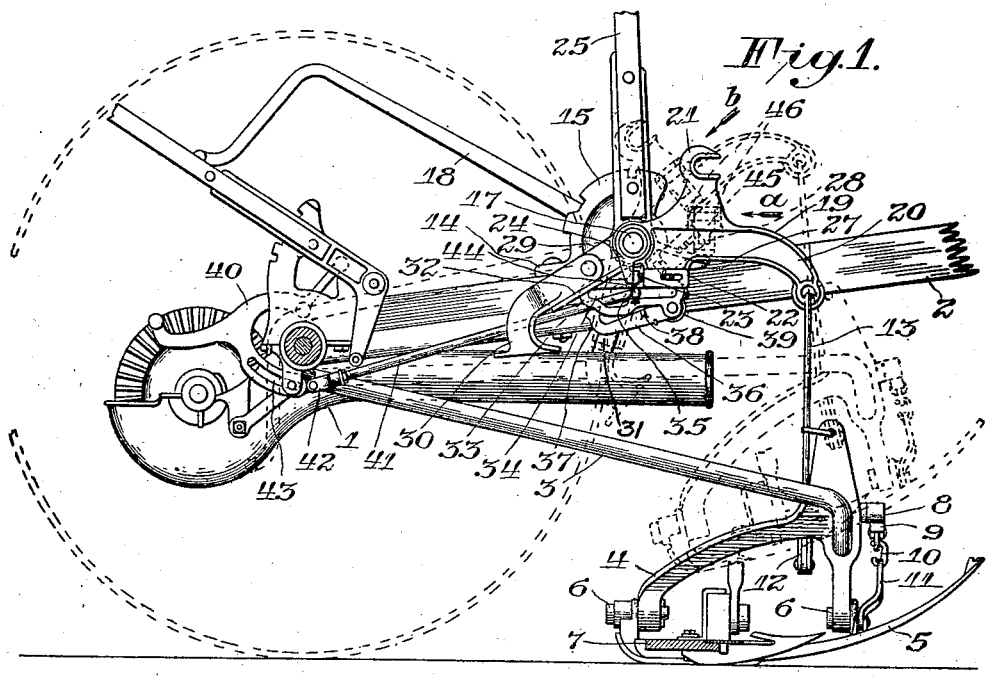

UNITED STATES PATENT OFFICE.

RICHARD E. McINTIRE, OF CHICAGO, ILLINOIS, ASSIGNOR TO INTERNATIONAL HARVESTER COMPANY OF NEW JERSEY, A CORPORATION OF NEW JERSEY.

MOWING-MACHINE.

1,278,182.  Specification of Letters Patent.  Patented Sept. 10, 1918.

Application filed February 4, 1916. Serial No. 76,222.

*To all whom it may concern:*

Be it known that I, RICHARD E. McINTIRE, a citizen of the United States, residing at Chicago, in the county of Cook and State of Illinois, have invented certain new and useful Improvements in Mowing-Machines, of which the following is a full, clear, and exact specification.

My invention relates to mowing machines, and particularly to the type commonly called vertical lift mowers, wherein means are provided for adjusting the cutting apparatus to a higher or lower plane, such apparatus usually including a finger bar hinge-jointed to a coupling frame, which is hinge-jointed to the wheel frame of the machine in a manner to rise and fall at its grassward end in following the inequalities of the surface of the ground, and wherein the finger bar is adapted to be adjusted from a substantially horizontal position to a vertical one relative to the wheel frame by means of an improved form of hand and foot lever mechanism carried by the wheel frame and connected with the coupling frame and finger bar by means of link and bell crank connections in a common way.

It consists in providing a retaining member carried by a primary lever and adapted to automatically engage with the coupling frame in a manner to retain it in an elevated position while the finger bar is initially moving from a vertical toward an operative position and to be automatically disengaged and permit the coupling frame to fall to a lower plane as the finger bar swings downward to a horizontal position; in providing improved means whereby the clutch mechanism is controlled in a manner to suspend the operation of the cutting apparatus when the finger bar is raised to a predetermined angle and to retain it in suspension while the finger bar is being lowered from the vertical to an angle permitting a safe operation of the cutting apparatus; in providing an improved construction whereby the hand and foot lever mechanism is independently connected with a primary lever arm in a manner permitting the primary lever to move independent of the hand lever during a part of its movement to raise the finger bar when actuated by the foot lever; and in providing interlocking means carried by the hand lever and primary lever adapted to couple them together during an initial movement of the hand and primary levers in a direction to lower the coupling frame and cutting apparatus whereby the hand lever actuates the primary lever positively during a limited part only in that direction.

The object of the invention is to provide a reliable and efficient mechanism for the purpose indicated. For purposes of illustration I have shown one embodiment of my invention in the accompanying drawings, in which—

Figure 1 is a side elevation of part of a mowing machine having my invention embodied in its construction.

Fig. 2 is a side elevation of part of Fig. 1, showing the mechanism in a different position of adjustment.

Fig. 3 is a rear elevation, partly in section, of part of the finger bar adjusting mechanism.

Fig. 4 is a side elevation designed to illustrate the operation of the hand lever mechanism.

Fig. 5 is a front view on an enlarged scale of part of Fig. 1 in the direction of the arrow *a*.

Fig. 6 is a front view of part of Fig. 1, similar to Fig. 5, and in the direction of the arrow *b*.

Fig. 7 is a top view on an enlarged scale of part of Fig. 2 in the direction of the arrow *c*.

The same reference numerals designate like parts throughout the several views.

1 represents part of the main frame of the machine having the rear end of the draft tongue 2 secured thereto, 3 the coupling frame having the yoke 4 pivotally mounted thereon, 5 the inner shoe hingedly connected with the yoke by means of hinge pins 6, and 7 the finger bar secured to the shoe. 8 represents a rock shaft journaled in a fore and aft direction upon the yoke 4, having an arm 9 secured to its front end that is connected by means including a link 10 with a vertically disposed arm 11 carried by the shoe 5, and 12 represents an arm secured to the opposite end of the rock shaft, with which is operatively connected the lower end of a vertically disposed link 13. A bracket member is secured to the frame of the machine and includes a base 14, a vertically disposed notched sector 15, and a transverse bearing sleeve 16 in which is journaled an arm 17 forming part of a foot lever 18 and extending toward the rear of the machine. Journaled upon the arm 17 is a primary lever 19 having a forwardly extending arm 20, with which is connected the upper end of the link 13 and an upwardly extending arm 21 adapted to be connected with a counterbalancing spring mechanism (not shown). A barrel member 22 at its lower side receives an adjusting screw 23 which is adapted to engage with an arm 24 secured to the end of the arm 17 whereby, when the foot lever 18 is depressed by the operator, the primary lever 19 is turned about its axis in a direction to lift the coupling frame and swing the finger bar and shoe about its axis upon the yoke 4 in a common way. Journaled upon a sleeve 19' between the primary lever 19 and the notched sector 15, is a hand lever 25 provided with a common form of spring-pressed detent 26 adapted to engage with the notched sector 15. A toe member 27 is adapted to engage with a laterally extending lug 28 on the side of the primary lever 19 in a manner to cause the primary lever to turn with the hand lever when said lever is turned rearward to lift the cutting apparatus. 29 represents a rearwardly extending arm forming a part of the primary lever 19, and pivotally connected therewith is a hook 30 adapted to swing, assisted by gravity, into engagement with the coupling frame 3 when it has reached a predetermined height and controlled by the stop member 31 carried by the main frame of the machine, as shown in Fig. 2. The arm 29 is provided with a laterally extending rib 32 that engages with the hook 30 in a manner to disengage it from the coupling frame when the primary lever has reached a predetermined angle of movement in a forward direction and permit the finger bar to swing toward an operative position. The hand lever 25 is provided with a web member 33 on its lower end having a slotted opening 34 therein that is provided with a shoulder part 35 near the middle part of its lower wall, and 36 represents a switch member having its front end pivotally connected with the forward part of the web 33 and its opposite upturned end 37 adapted to swing upward along the side of the web adjacent the rear end of the slotted opening 34, a stop lug 38 on the side of the switch member engaging with the web in a manner to limit a swing thereof in one direction, and 39 represents a coiled spring operative to yieldingly press the switch in the same direction.

It is desirable, in the operation of machines of the class indicated, that means be provided whereby the clutch mechanism will be disengaged or permitted to engage when the finger bar has reached a predetermined degree of elevation and that such mechanism will be locked securely against accidental displacement, and also that the operator be permitted to operate the clutch controlling mechanism freely in either direction when the finger bar is in a horizontal and operative position, and for such purpose I have provided the following mechanism:

A foot lever 40 is pivotally mounted upon the frame of the machine within convenient reach of the operator and connected with a clutch mechanism in the same manner as shown and described in Patent No. 856,269, issued June 11, 1907, to John W. Latimer, and includes a rod 41 having its rear end adjustably threaded into a socket member 42 disposed at the front end of the slotted opening 43 in the foot lever 40, the front end of the rod being provided with a laterally turned hook member 44 that is slidably received by the slotted opening 34 in the web member 33 of the hand lever 25. When the hand lever is in the position shown in Fig. 1 and the finger bar in a horizontal and operative position, the foot lever 40 may be operated freely in either direction, the switch member 36, under the action of the spring 39, lifting the front end of the rod 41 above the shoulder 35 and permitting it to slide freely in opposite directions in the slotted opening 34, whereby the operator may control the clutch mechanism in either direction at will. When the hand lever is in the position shown in Fig. 2, the finger bar will be disposed vertically, the hook 30 will engage with the coupling frame 3, and the clutch mechanism will be secured against engagement, the foot lever 40 being in an inoperative position, having been rocked forward to the limit of its slotted opening 43 and locked against a rocking movement in an opposite direction by means of the hooked end of the rod 41 engaging with the rear end of the slot 34 in the hand lever 25, which is secured in position by means of its detent mechanism engaging with the notched sector 15. When the hand lever is turned forward to permit the finger bar to swing toward a horizontal position, its initial movement will not affect the clutch controlling mechanism, as the hooked end of the rod 41 will slide freely in the slotted opening 34 until it reaches the shoulder 35, when a further movement of the hand lever in a forward direction will actuate the foot lever 40 by means of the rod 41 in a manner permitting engagement with the clutch mechanism. The primary lever 19 being mounted on its pivot independent of the hand lever 25, permits it to be actuated by means of the foot lever 18 to lift the coupling frame and finger bar to plain left position, as shown in Fig. 1, without changing the position of the hand lever, and to turn the finger bar to a vertical position on its pivot 6, the hand lever is turned rearward beyond a predetermined angle, whereby the toe member 27 engages with the lug 28 on the primary lever, thereby turning said lever on its pivot and, through the lever and the finger bar, swinging the finger bar to vertical position.

My invention includes means whereby, when the hand lever is turned forward from its rearward position of adjustment with the finger bar held in a vertical position, it will be locked in engagement with the primary lever in a manner to force it to descend, and, release the finger bar, permitting it to turn from a vertical toward a horizontal position, such mechanism including a swinging detent 45 having one end pivotally connected with ear members 46 integral with the primary lever 19, its opposite end being provided with a hook 47 that is adapted to temporarily engage with the toe member 27 of the hand lever 25 when the detent is turned toward the toe member by engaging with the adjacent face of the notched sector 15, as shown in Figs. 2 and 7.

Having shown and described one embodiment of my invention, I do not desire that it be confined to the specific details of the structure as illustrated, it being understood that changes may be made in the form, proportion and organization of its various parts without departing from the spirit of the invention as indicated by the appended claims.

What I claim as my invention and desire to secure by Letters Patent is:

1. In a mower, a main frame, a finger bar operatively connected thereto, mechanism for varying the elevation of the same including a manually adjustable lifting arm operatively connected to said bar, an independently movable hand lever, and means including a pivoted member carried by said arm for connecting said lever positively to said arm during the first part of the lowering movement of said bar.

2. In a mower, a main frame, a finger bar operatively connected thereto, mechanism for varying the elevation of the same including a manually adjustable lifting arm operatively connected to said bar, an independently movable hand lever, and automatically acting pivoted latch mechanism for connecting said lever to said arm during the first part of the movement of said bar.

3. In a mower, a main frame, a finger bar operatively connected thereto, mechanism for varying the elevation of the same including a manually adjustable lifting arm operatively connected to said bar, an independently movable hand lever, and latching mechanism engageable with said frame and upon such engagement automatically movable into position between said arm and lever during the lifting movement of said bar.

4. In a mower, a main frame, a finger bar operatively connected thereto, mechanism for varying the elevation of the same including a manually adjustable lifting arm operatively connected to said bar, an independently movable hand lever, and latching mechanism engageable with said frame and upon such engagement automatically movable into locking position between said arm and lever during the lifting movement of said bar and automatically releasable after the initial lowering movement of said bar.

5. In a mower, a main frame, a finger bar operatively connected thereto, means for varying the elevation of said bar including a lifting arm operatively connected thereto, a hand lever coöperating with said lifting arm and movable independently thereof, means for positively connecting said hand lever and arm during the initial lowering movement of said bar, and foot lever mechanism pivoted on said main frame and coöperating with said arm during the initial lifting and final lowering movement of said bar and remaining stationary during the remainder of the raising and lowering of said finger bar.

6. A mowing machine including, in combination, a main frame, a coupling frame having a pivotal connection with said main frame, a finger bar hingedly connected with said coupling frame in a manner permitting it to swing from a horizontal to a vertical position, means for adjusting said coupling frame and finger bar, said means including a primary lever pivotally mounted upon said frame, operative connections between said primary lever and said coupling frame and finger bar, a hand lever pivoted on said main frame and adapted to engage with said primary lever, and a detent carried by one of said levers movable with respect thereto and operative to hold the remaining lever in engagement therewith during a predetermined part of its movement in one direction.

7. A mowing machine including, in combination, a main frame, a coupling frame having a pivotal connection with said main frame, a finger bar hingedly connected with said coupling frame in a manner permitting it to swing from a horizontal to a vertical position, means for adjusting said coupling frame and finger bar, said means including a primary lever pivotally mounted upon said frame, link connections between said primary lever and said coupling frame and finger bar, a hand lever pivoted on said main frame and adapted to engage with said primary lever, and a pivoted detent carried by said primary lever and operative to hold said hand lever in engagement therewith during a predetermined part of its movement in a direction to lower said finger bar and said coupling frame.

8. A mowing machine including, in combination, a main frame, a coupling frame having a pivotal connection with said main frame, a finger bar hingedly connected with said coupling frame in a manner permitting it to swing from a horizontal to a vertical position, means for adjusting said coupling frame and finger bar, said means including a primary lever pivotally mounted upon said frame, link connections between said primary lever and said coupling frame and finger bar, a hand lever pivoted on said main frame and adapted to engage with said primary lever, a pivoted detent carried by said primary lever, and means operative to swing it into engagement with said hand lever when said two levers have reached a predetermined degree of movement in a direction to lift said coupling frame and finger bar and retain it in engagement therewith during a predetermined part of its movement in an opposite direction.

9. A mowing machine including, in combination, a main frame, a coupling frame having a pivotal connection with said main frame, a finger bar hingedly connected with said coupling frame in a manner permitting it to swing from a horizontal to a vertical position, means of adjusting said coupling frame and finger bar, said means including a primary lever pivotally mounted upon said frame, link connections between said primary lever and said coupling frame and finger bar, a hand lever pivoted on said main frame and adapted to engage with said primary lever, a pivoted detent carried by said primary lever and adapted to engage with a fixed part carried by said frame in a manner to swing it into engagement with said hand lever when said two levers have reached a predetermined degree of movement in a direction to lift said coupling frame and finger bar and retain it in engagement therewith during a part of its movement in an opposite direction.

10. A mowing machine including, in combination, a main frame, a coupling frame having a pivotal connection with said main frame, a finger bar hingedly connected with said coupling frame in a manner permitting it to turn from a horizontal to a vertical position, means for adjusting said coupling frame and said finger bar, said means including a primary lever pivotally mounted upon said main frame, link connections between said primary lever and said coupling frame and finger bar, a hand lever pivotally mounted on said main frame and including a toe member adapted to engage with said primary lever during a predetermined degree of its movement, and a detent carried by said primary lever movable with respect thereto and operative to hold said toe member in engagement with said primary lever during a predetermined part of its movement in a direction to lower said finger bar and said coupling frame.

11. A mowing machine including, in combination, a main frame, a coupling frame having a pivotal connection with said main frame, a finger bar hingedly connected with said coupling frame in a manner permitting it to turn from a horizontal to a vertical position, means for adjusting said coupling frame and said finger bar, said means including a hand lever pivotally mounted on said frame and operatively connected with said coupling frame and finger bar, a power transmission gear mechanism, a clutch mechanism forming part of said power transmission gear mechanism, said clutch mechanism including a clutch tripping foot lever pivotally mounted on said frame and provided with a concentric slotted opening, said hand lever being provided with a slotted opening having a shoulder near its middle, a link connection between said hand lever and said foot lever, said link having a hook received by the slot in said hand lever and adapted to engage with said shoulder when said hand lever has reached a predetermined degree of movement in a direction permitting said finger bar to turn to a horizontal and operative position and in a manner whereby said clutch tripping lever is turned about its axis in a direction permitting said clutch mechanism to engage.

12. A mowing machine including, in combination, a main frame, a coupling frame having a pivotal connection with said main frame, a finger bar hingedly connected with said coupling frame in a manner permitting it to turn from a horizontal to a vertical position, means for adjusting said coupling frame and said finger bar, said means including a hand lever pivotally mounted on said frame and operatively connected with said coupling frame and finger bar, a power transmission gear mechanism, a clutch mechanism forming part of said power transmission gear mechanism, said clutch mechanism including a clutch tripping foot lever pivotally mounted on said frame and provided with a concentric slotted opening, said hand lever being provided with a slotted opening having a shoulder near its middle, a link connection between said hand lever and said foot lever, said link having a hook received by the slot in said hand lever and adapted to engage with said shoulder when said hand lever has reached a predetermined degree of movement in a direction permitting said finger bar to turn to a horizontal and operative position and in a manner whereby said clutch tripping lever is turned about its axis in a direction permitting said clutch mechanism to engage, and a spring-pressed switch member pivotally mounted on said hand lever and operative to prevent said hook from engaging with said shoulder during a limited movement of said hand lever.

13. In a mowing machine, in combination, a main frame, cutting apparatus including a coupling frame pivotally carried thereby, power mechanism for said cutting apparatus including a clutch mechanism, means for raising and lowering said coupling frame including a lever provided with a slotted opening having a shoulder therein, a clutch shipping rod slidably received by the slot, and means for directing the movement of said rod in said slot.

14. In a mowing machine, in combination, a main frame, cutting apparatus including a coupling frame pivotally carried thereby, power mechanism for said cutting apparatus including a clutch mechanism, means for raising and lowering said coupling frame including a lever provided with a slotted opening having a shoulder therein, a clutch shipping rod slidably received by the slot, and means carried by said lever for directing the movement of said rod in said slot.

15. In a mowing machine, in combination, a main frame, cutting apparatus including a coupling frame pivotally carried thereby, power mechanism for said cutting apparatus including a clutch mechanism, means for raising and lowering said coupling frame including a lever provided with a slotted opening having a shoulder therein, a clutch shipping rod slidably received by the slot, and means pivotally carried by said lever for directing the movement of said rod in said slot.

16. In a mowing machine, in combination, a main frame, cutting apparatus including a coupling frame pivotally carried thereby, power mechanism for said cutting apparatus including a clutch mechanism, means for raising and lowering said coupling frame including a lever provided with a slotted opening having a shoulder therein, a clutch shipping rod slidably received by the slot, and a spring-pressed pivoted switch member carried by said lever for directing the movement of said rod in said slot.

17. In a mowing machine, in combination, a main frame, cutting apparatus including a coupling frame pivotally carried thereby, power mechanism for said cutting apparatus including a clutch mechanism, means for raising and lowering said coupling frame including a lever provided with a slotted opening having a shoulder therein, a clutch shipping rod slidably received by the slot, and means slidably engaging said rod for directing the movement thereof in said slot.

18. In a mowing machine, in combination, a main frame, cutting apparatus including a coupling frame pivotally carried thereby, power mechanism for said coupling apparatus including a clutch mechanism, means for raising and lowering said coupling frame including a lever provided with a slotted opening having a shoulder therein near its middle, and a clutch shipping rod slidably received by said slot and operative to ship said clutch when said lever is actuated.

In testimony whereof I affix my signature.

RICHARD E. McINTIRE.

Copies of this patent may be obtained for five cents each, by addressing the "Commissioner of Patents, Washington, D. C."